United States Patent

Huang

[11] Patent Number: 5,803,427
[45] Date of Patent: Sep. 8, 1998

[54] STRUCTURE FOR MOUNTING AN OIL-SINK MOTOR IN AN OIL TANK

[76] Inventor: Tsung-jen Huang, No. 5, Alley 8, Lane 402, Sungchiang Rd., Taipei, Taiwan

[21] Appl. No.: 747,808

[22] Filed: Nov. 14, 1996

[51] Int. Cl.[6] .................................................. F16M 11/00
[52] U.S. Cl. ...................... 248/674; 248/295.11; 187/272
[58] Field of Search .............................. 248/674, 295.11, 248/312, 327, 224.51, 291.11, 286; 417/423.3, 360; 187/272, 275

[56] References Cited

U.S. PATENT DOCUMENTS

| | | | |
|---|---|---|---|
| 3,252,547 | 5/1966 | Hornedo | 187/272 |
| 4,735,291 | 4/1988 | Kappenhagen | 187/272 |
| 5,131,821 | 7/1992 | Marioni et al. | 417/423.3 |

*Primary Examiner*—Leslie A. Braun
*Assistant Examiner*—Willie Berry, Jr.
*Attorney, Agent, or Firm*—Calvin B. Ward

[57] ABSTRACT

A structure for mounting an oil-sink motor in an oil tank is disclosed wherein the tank includes a door pivotably connected thereto. The structure includes a hinge fixedly connected to the door. A support is fixedly connected to the hinge and extends to a bottom of the tank. A "T"-shaped motor carriage which is fixedly attached to the motor, is fixedly engaged with a wall of the support defining a slot and an opening cooperatively forming a "T"-shaped configuration.

8 Claims, 6 Drawing Sheets

STRUCTURE FOR MOUNTING AN OIL-SINK MOTOR IN AN OIL TANK

FIELD OF THE INVENTION

The present invention is related to a structure for mounting an oil-sink motor in an oil tank, particularly to a structure for mounting an oil-sink motor in an oil tank wherein the motor can be brought to a position outside the tank by pivoting a door of the tank.

BACKGROUND OF THE INVENTION

A large power motor, such as one for driving an elevator, generates a lot of heat when it is operated. To efficiently dissipate the heat, such motor is mounted in a tank which is filled with oil (such motor is termed as "oil-sink motor" throughout the specification).

FIG. 7 shows a prior art for mounting an oil-sink motor 40 in an oil tank 30, wherein the motor 40 is mounted in the tank 30 by extending four screws 41 through a bottom wall of the tank 30 and four mounting feet of the motor 40. A door 31 is pivotably connected to the tank 30.

When a worker intends to repair or maintain the motor 40, firstly he (she) needs to manipulate a valve (not shown) to empty the oil in the tank 30. Then, he (she) needs to open the door 31 and enter the tank 30 to loosen the screws 41. Finally, he (she) needs to individually lift the motor 40 to a position atop the tank 30 so that he (she) can proceed the repair or maintenance.

To enter the oil tank 30 causes that the worker's body or clothes may be dirtied by the greasy dirt in the tank 30. Secondly, it is time-consuming to empty the oil in the tank 30 and loosen the screws 41 before the repair or maintenance of the motor 40 is started, and to re-fill the tank 30 with oil and re-screw the screws 41 after the repair or maintenance is accomplished. Furthermore, it is laborious for the worker to individually lift the motor 40 from a bottom of the tank 30 to a top thereof.

The present invention therefore is aimed to provide an improved air conditioning apparatus to mitigate and/or obviate the aforementioned problems.

SUMMARY OF THE INVENTION

An objective of the present invention is to provide a structure for mounting an oil-sink motor in an oil tank whereby the oil-sink motor can be brought to a position outside and atop the tank quickly, without the necessity that the oil in the tank should be emptied beforehand and the worker should enter the tank to loosen screws.

Another objective of the present invention is to provide a structure for mounting an oil-sink motor in an oil tank whereby two or more workers can cooperate to exert a force on the motor to bring the motor to a position outside and atop the tank.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
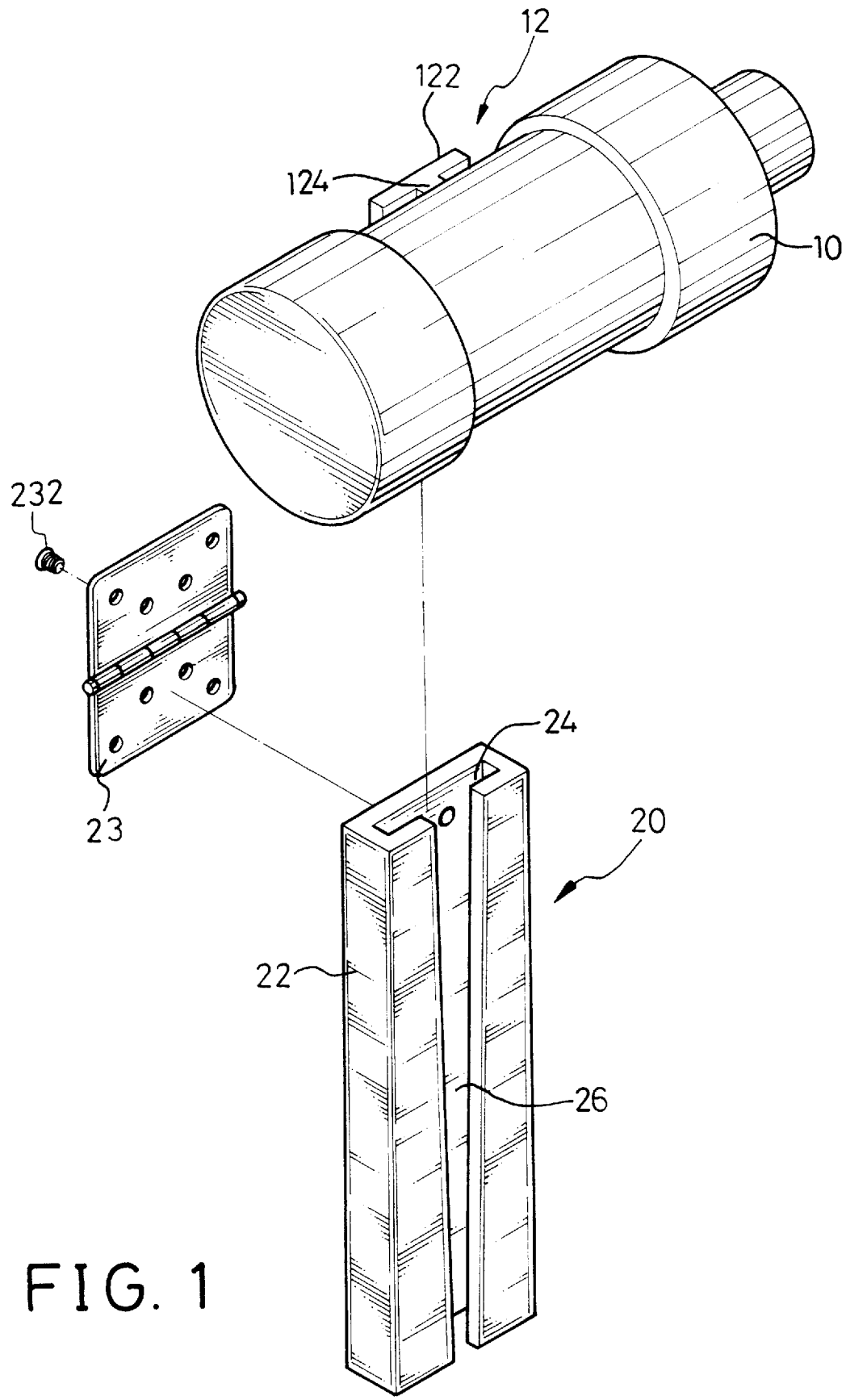
FIG. 1 is a perspective, exploded view showing the main components for constituting a first embodiment of a structure for mounting an oil-sink motor in an oil tank in accordance with the present invention and an oil-sink motor.
Figure 2:
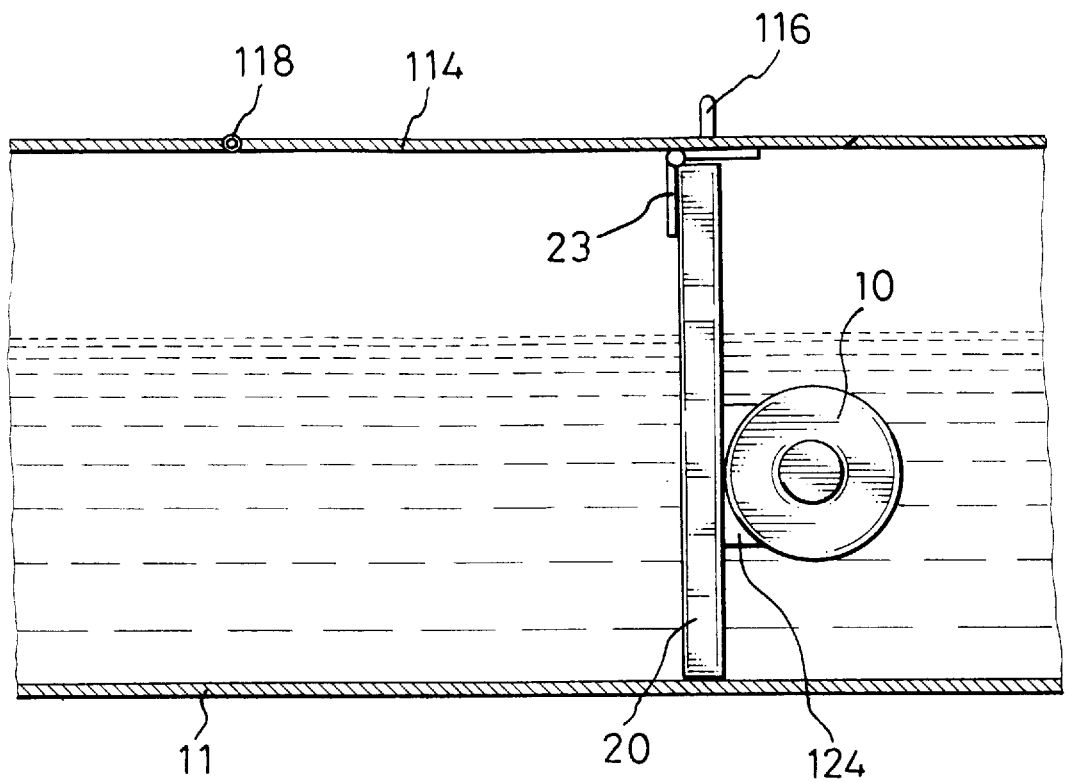
FIG. 2 a partially elevational, cross-sectional view showing that the first embodiment of FIG. 1 is used to mount the motor in an oil tank.
Figure 3:
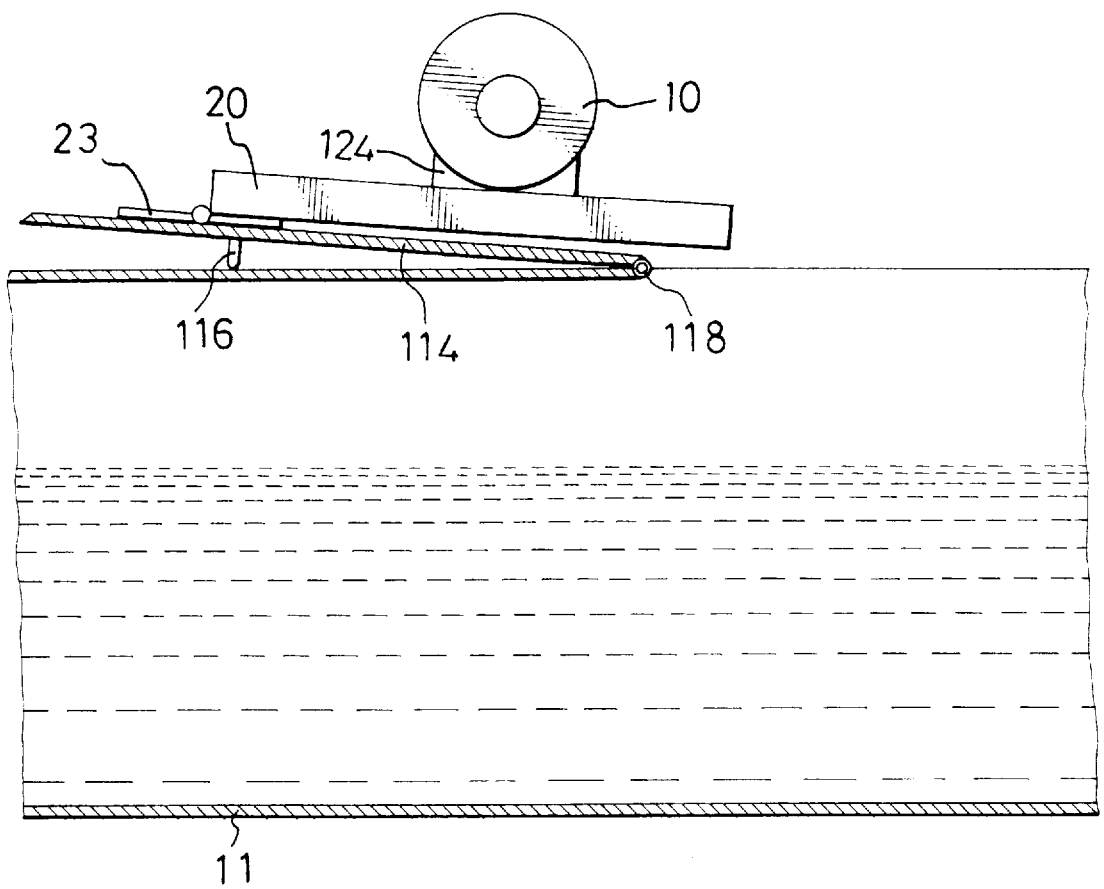
FIG. 3 is view similar to FIG. 2, but showing that the motor is brought to a position atop and outside the oil tank.

Referring to FIGS. 1 to 3, a first embodiment of a structure for mounting an oil-sink motor 10 in an oil tank 11 is disclosed, wherein the structure mainly includes a hinge 23, an elongate support 20 and a substantially "T"-shaped motor carriage 12. The support 20 has a wall 22 so configured that it defines a T-shaped recess comprising a slot 24 and an opening 26 in communication with the slot 24. The opening 26 has a width which is tapered smaller from a top of the support 20 to a bottom thereof, as viewed from FIG. 1. The slot 24 and the opening 26 together form a configuration similar to that of the "T"-shaped configuration of the carriage 12. The carriage 12 defines a central rib 124 and a lateral web 122 wherein the lateral web 122 has a size substantially the same but slightly smaller than that of the slot 24.

To mount the motor 10 in the tank 11, firstly the motor 10 is attached to the support 20 by inserting the carriage 12 into the slot 24 and opening 26 from the top of the support 20 toward a bottom thereof until the carriage 12 reaches a fixing point, in which the central rib 124 is fixedly engaged with the wall 22 defining the opening 26, as shown by FIG. 2. At the fixing point, the opening 26 has a width the same as that of the central rib 124 and thus downward travel of the motor 10 will be arrested.

Then, particularly referring to FIG. 2, a first leaf of the hinge 23 is fixedly attached to a rear face of a door 114 of the tank 11 by extending four screws 232 (only one is shown in FIG. 1) through the first leaf and the door 114, wherein the first leaf is located just below a handle 116 fixedly mounted on the door 114. Thereafter, the motor 10 together with the support 20 is brought into the tank 11. Finally, a top end of a rear side of the support 20 is fixedly attached to a second leaf of the hinge 23 by extending four screws (not shown) through the second leaf and the support 20. A bottom end of the support 20 extends to reach a bottom of the tank 11.

As shown in FIG. 2, the door 114 is pivotably connected to the tank 11 via a pivot pin 118. After the oil-sink motor 10 is mounted in the tank 11, oil is poured into the tank 11 to immerse the motor 10 in oil.

When a worker wants to bring the motor 10 to a position outside the tank 11 to proceed a repair or maintenance thereof, all the worker has to do is to pull the handle 116 to pivot counterclockwise the door 114 about the pivot pin 118 to reach a position as shown by FIG. 3, in which the door 114 is located on a top of the tank 11, the support 20 is located on the door 114 and the motor 10 is located on the support 20. During the moment of the motor 10 moving from the position within the oil to the position atop and outside the tank 11, most of the oil adhered to the motor 10 will automatically flow back to the tank 11; thus, once the motor 10 is brought to the position as shown by FIG. 3, a repair or maintenance thereof can be immediately proceeded. After the repair or maintenance is finished, the motor 10 can be brought to return to its operating position as shown by FIG. 2 by pivoting the door 114 clockwise.

Thus, in accordance with the present invention, to move the oil-sink motor 10 out of the oil tank 11 for repair or maintenance and then return it back into the oil tank 11 can be very easily and efficiently achieved. To remove the motor 10 from the oil tank 11 for repair or maintenance and then return it back into the tank 11, the present invention does not need to empty and then refill the oil in the tank 11. Also, the present invention does not need the worker to enter and then leave the tank 11. Furthermore, the present invention does not involve loosening and then re-tighten any parts of the structure for mounting the motor 10 in the tank 11. Finally, two or more workers can cooperatively exert a force on the handle 116 to raise the motor 10 to reach the position atop and outside the tank 11. Since a tank in the prior art has limited space, it is impossible to allow two or more workers to simultaneously enter therein to cooperatively lift a motor.

Figure 4:
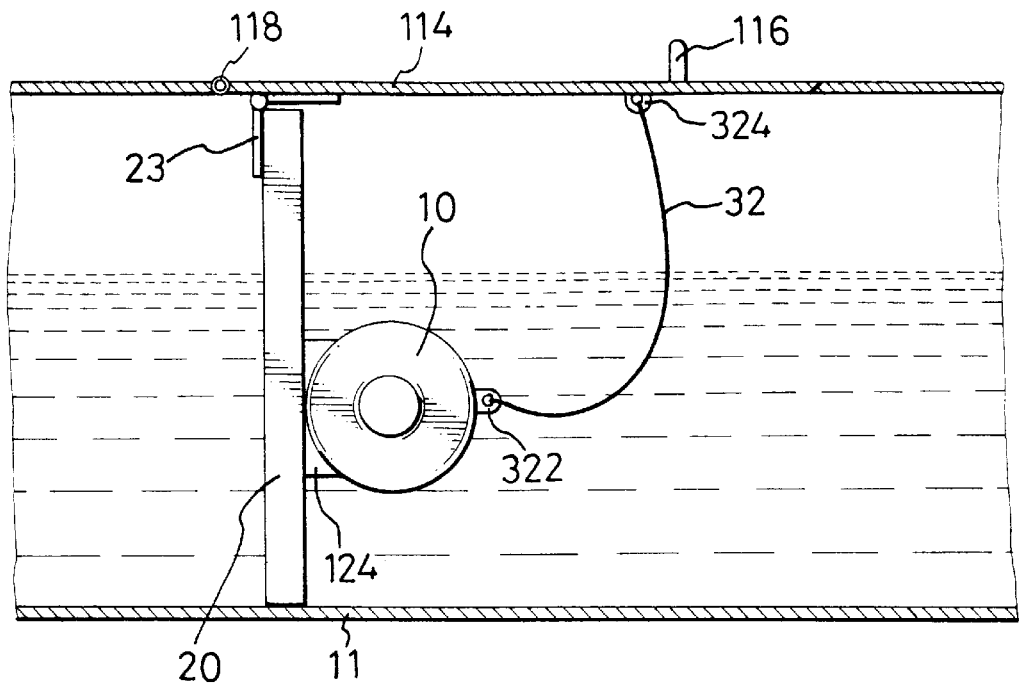
FIG. 4 is a partially elevational, cross-sectional view showing that a second embodiment in accordance with the present invention is used to mount the motor in the tank.
Figure 5:
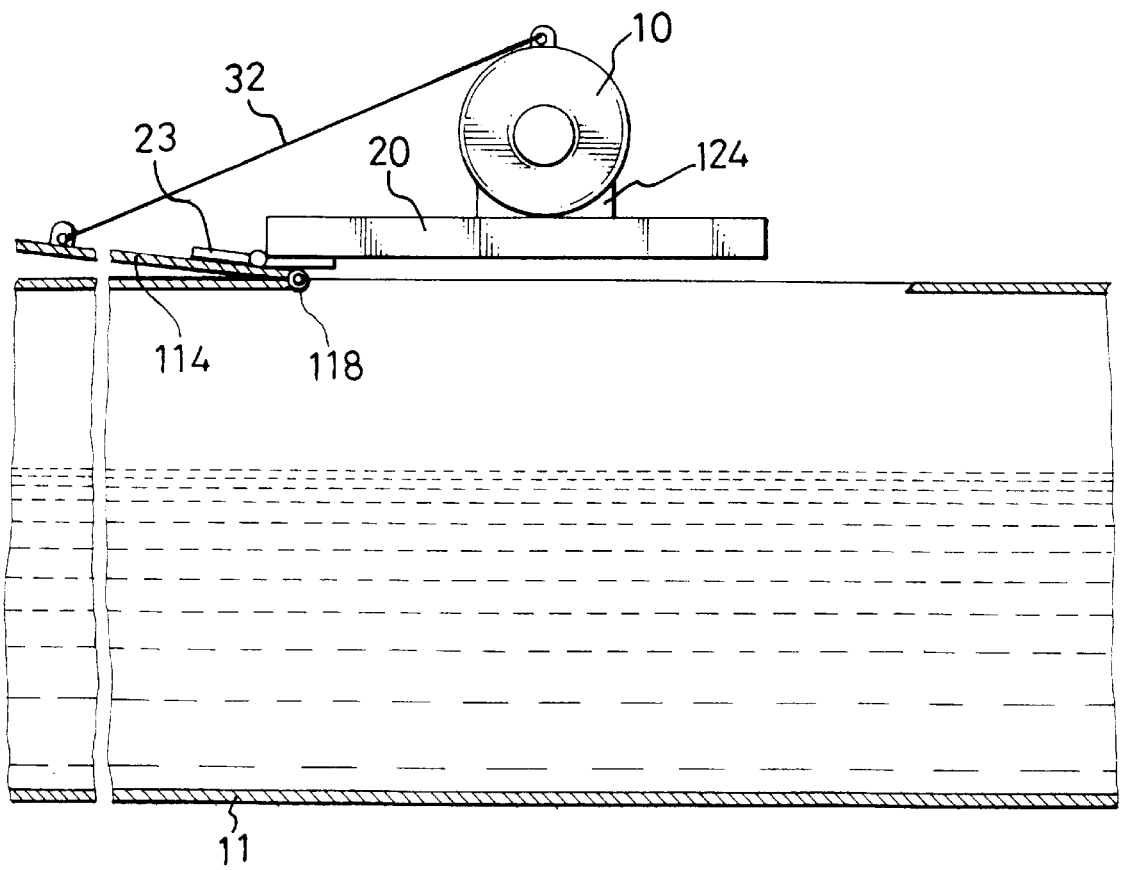
FIG. 5 is view similar to FIG. 4, but showing that the motor is brought to a position atop and outside of the oil tank.

FIGS. 4 and 5 show a second embodiment of the present invention. Except the following differences, the second embodiment is substantially the same as the first embodiment: the first leaf of the hinge 23 is attached to the door 114 near the pivot pin 118 rather than just below the handle 116 and a steel rope 32 is used to connect the motor 10 and the door 114 via a first lug 322 fixedly attached to the motor 10 and a second lug 324 fixedly attached to the door 114 and located near the handle 116.

To move the motor 10 of the second embodiment out of the tank 11, all the worker has to do is the same as that for moving the motor of the first embodiment: i.e. pull the handle 116 to pivot the door 114 counterclockwise to cause the motor 10 to move from the position as shown by FIG. 4 to reach the position as shown by FIG. 5.

In comparison with the first embodiment, since the motor 10 together with the support 20 of the second embodiment is attached to the door 114 near the pivot pin 118, so, to move the motor 10 out of the tank 11 in the second embodiment requires less effort.

Figure 6:
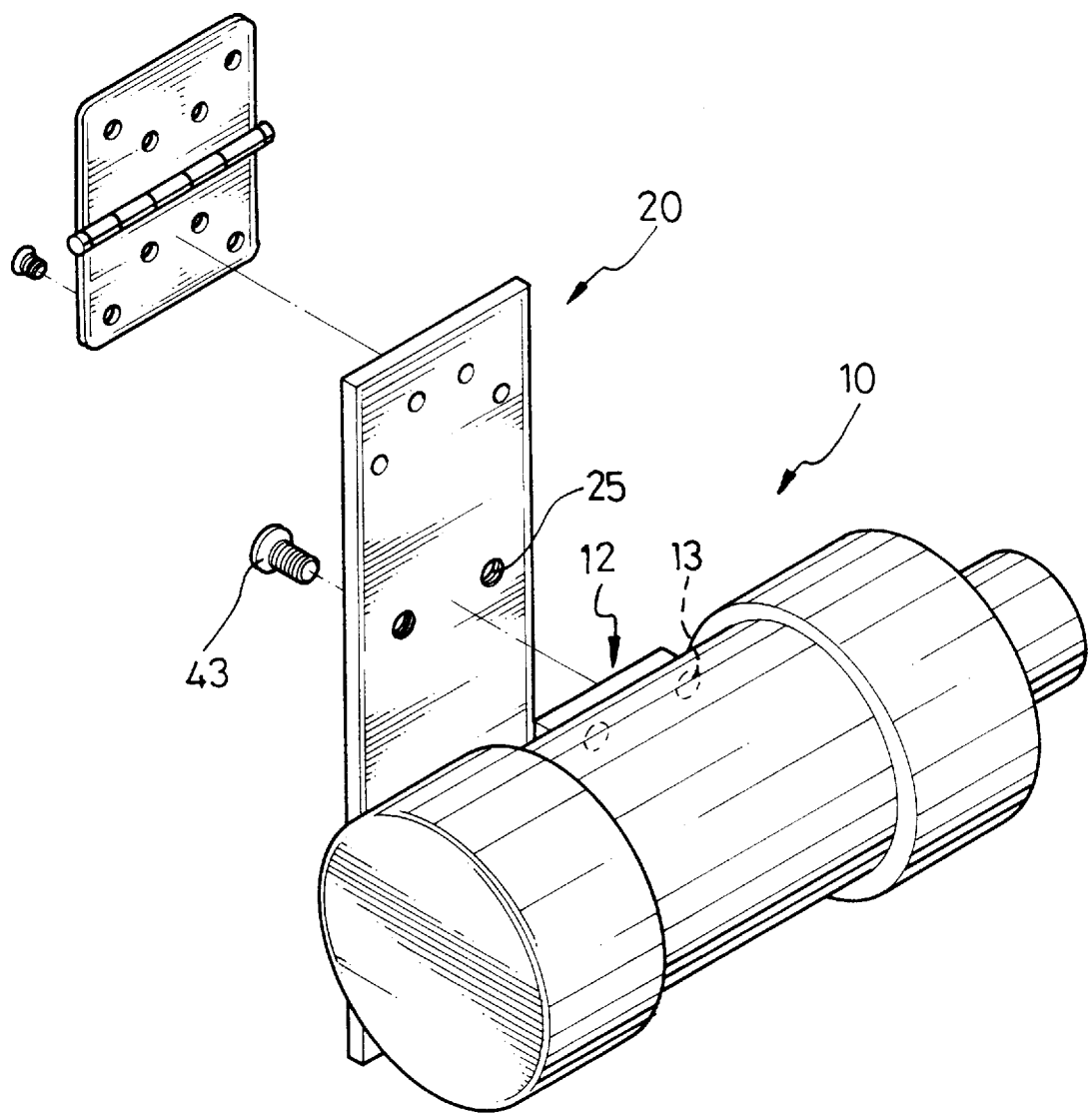
FIG. 6 is a view similar to FIG. 1, but showing a third embodiment in accordance with the present invention.
Figure 7:
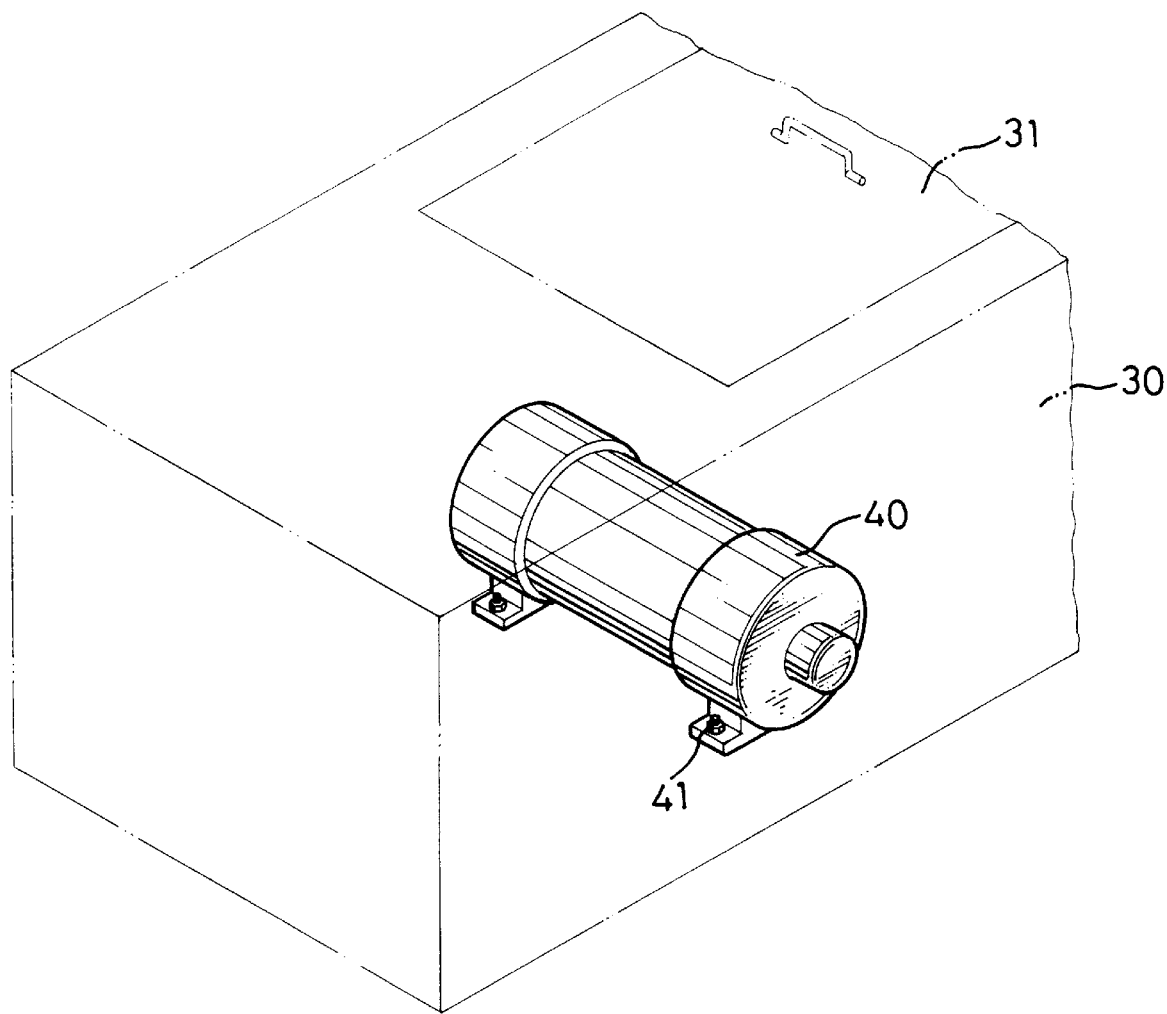
FIG. 7 is a perspective view showing a prior art for mounting a motor in an oil tank.

FIG. 6 shows a third embodiment of the present invention wherein the support 20 is formed to be an elongate and flat plate defining two first screw holes 25. The carriage 12 in this embodiment is formed to be a block defining two second screw holes 13. When the motor is attached to the support 20, two screws 43 (only one is shown) are used to extend through the screw holes 25 and 13 to fixedly connect the support 20 and the motor 10 together. Thereafter, the motor 10 together with the support 20 can be mounted within the oil tank 11 by a manner as illustrated by FIGS. 2 or 4.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An oil-sink motor mounting structure, comprising:
    a motor:
    a door adapted to be pivotably connected to an oil tank:
    a hinge comprising a first leaf fixedly attached to a rear face of the door and a second leaf,
    a support comprising a top end fixedly attached to the second leaf of the hinge and a bottom end; and
    means for fixedly connecting the motor to the bottom end of the support.

2. The structure in accordance with claim 1, wherein the support is an elongate plate and has a wall so configured that it defines a T-shaped recess comprising a slot and an opening in communication with the slot, the opening having a width which is tapered smaller from a top of the support to a bottom thereof, and wherein the connecting means is a substantially "T"-shaped carriage fixedly attached to the motor, having a central rib engaging with the wall of the support defining the opening at a fixing point wherein the opening has a width the same as that of the rib and a lateral web received in the slot.

3. The structure in accordance with claim 1, wherein the support is in the form of an elongate and flat plate and the connecting means is a carriage fixedly attached to the motor and at least one screw extending through the support and the carriage to fixedly connect the motor and the support together.

4. The structure in accordance with claim 3, wherein the carriage is in the form of a block.

5. An oil-sink motor mounting structure, comprising:
    a motor
    a door adapted to be pivotably connected to an oil tak via a pivot pin:
    a hinge comprising a first leaf fixedly attached to a rear face of the door and a second leaf;
    a support comprising a top end fixedly attached to the second leaf of the hinge and a bottom end;
    means for fixedly connecting the motor to the bottom end of the support; and
    a flexible element for connecting the door and the motor together.

6. The structure in accordance with claim 5, wherein the support is an elongate plate and has a wall so configured that it defines a T-shaped recess comprising a slot and an opening in communication with the slot, the opening having a width which is tapered smaller from a top of the support to a bottom thereof, and wherein the connecting means is a substantially "T"-shaped carriage fixedly attached to the motor, having a central rib engaging with the wall of the support defining the opening at a fixing point wherein the opening has a width the same as that of the rib and a lateral web received in the slot.

7. The structure in accordance with claim 5, wherein the support is in the form of an elongate and flat plate and the connecting means is a carriage fixedly attached to the motor and at least one screw extending through the support and the carriage to fixedly connecting the motor and the support together.

8. The structure in accordance with claim 7, wherein the carriage is in the form of a block.

* * * * *